United States Patent [19]

Ylvisaker et al.

[11] Patent Number: 4,964,259
[45] Date of Patent: Oct. 23, 1990

[54] FORM-FILL-SEAL DEFLATION METHOD AND APPARATUS

[75] Inventors: Jon A. Ylvisaker, Marietta; Louis R. Boston, Chittenango, both of N.Y.

[73] Assignee: Borden, Inc., Columbus, Ohio

[21] Appl. No.: 388,820

[22] Filed: Aug. 2, 1989

[51] Int. Cl.⁵ .................... B65B 9/08; B65B 31/04; B65B 51/30
[52] U.S. Cl. ........................ 53/433; 53/373; 53/451; 53/511; 53/551
[58] Field of Search ............... 53/373, 433, 450, 451, 53/481, 511, 526, 550, 551, 552

[56] References Cited

U.S. PATENT DOCUMENTS

| | | |
|---|---|---|
| 2,380,903 | 7/1945 | Ray . |
| 2,676,440 | 4/1954 | Campbell . |
| 2,768,085 | 10/1956 | Erekson et al. . |
| 3,314,804 | 4/1967 | Kosikowski . |
| 3,538,670 | 11/1970 | Morgan . |
| 3,634,993 | 1/1972 | Pasco et al. ............... 53/433 |
| 3,918,235 | 11/1975 | Brown, Jr. et al. ......... 53/551 X |
| 4,144,693 | 3/1979 | Ogata .................... 53/433 |
| 4,372,097 | 2/1983 | Wyslotsky . |
| 4,418,513 | 12/1983 | Plahm .................... 53/481 X |
| 4,424,659 | 1/1984 | Perigo et al. . |
| 4,561,925 | 12/1985 | Skerjanec et al. . |
| 4,631,899 | 12/1986 | Nielsen . |
| 4,633,654 | 1/1987 | Sato et al. ............... 53/526 X |
| 4,642,969 | 2/1987 | Johnson .................. 53/433 |

Primary Examiner—Robert L. Spruill
Assistant Examiner—Linda B. Johnson
Attorney, Agent, or Firm—Sidney W. Millard

[57] ABSTRACT

A process and apparatus for forming, filling, sealing and deflating a package of goods prior to the time the fill opening is sealed includes a blast of air against the exterior flexible sidewalls of the package to thereby drive gas from the inside of the package.

20 Claims, 2 Drawing Sheets

FORM-FILL-SEAL DEFLATION METHOD AND APPARATUS

FIELD OF THE INVENTION

This invention relates to a flexible plastic sheet which is formed into a continuously flowing endless tube. The tube is sealed along its sides and at its leading edge to form a hollow tube with a sealed bottom. Then the tube is partially filled with some suitable product such as noodles and the tube above the noodles is sealed. The sealed container of noodles is then severed from the tube.

BACKGROUND OF THE INVENTION

Apparatus and processes are known where a tube of plastic wrap is continuously fed through a bag forming, filling and sealing apparatus. Initially the bottom or leading edge of the bag or package is sealed and a suitable volume and weight of goods is deposited into the tube. Such goods may include noodles, peanuts, aluminum washers or the like. Then the tube is sealed above the top of the goods and the package is severed from the continuously moving tube.

It is conventional for sealing jaws to seal the top of the package while simultaneously forming an adjacent seal which comprises the bottom of the next following container. Inherently air is trapped in the package in the head space between the goods and the top seal. The problem which exists in the industry is how to deflate the gas impermeable package to reduce the package volume prior to the time it is sealed.

It will be self-evident that a pound of aluminum washers will pull the sidewalls of the container toward each other and thereby create a much smaller volume of air in the head space than will a one pound batch of spirally-wound egg noodles. The geometric shape of the washers is such that the washers align with each other and take up a small volume of space. On the other hand, the egg noodles are wound in a fashion to make up a much larger geometric shape and thereby the radial bulge of the plastic packaging will be greater.

It is not just that the air is trapped in the package and creates a more bulky package. Evacuation of the air from the package is important even where the excess bulk is acceptable. In some instances the goods within the package are susceptible to deterioration when exposed to relatively large volumes of gases as may be in a sample of air. By way of example, some foods such as cheese tend to oxidize or mold over a period of time if sufficient oxygen is contained within the package.

Industry has recognized the problem and three conventional operations are employed to solve it, that is, deflate the package to remove air.

One of the solutions for deflating packages is to puncture the package with small holes after the goods are sealed therein. The small holes allow the excess air within the package to be expelled by mechanical application of force or simply by the force of gravity settling the products during shipment and the like. However, this particular solution to the problem is unacceptable when foods are contained within the package. The pin holes used to allow the escape of trapped air also allow the ingress of contaminates from outside the package.

Another solution provided by the industry is a vacuum drawn on the inside of the package or container through the fill opening. The vacuum will extract the excess air or other gas and collapse the plastic sidewalls just prior to the sealing of the opening. This is a perfectly satisfactory solution in some instances. However, use of this system will slow the process due to the time required to evacuate gas from the fill tube. These systems also require the installation of equipment within the fill tube to close the tube off from the atmosphere. This additional equipment reduces the tube diameter which may cause plugging due to product bridging.

A third solution to the package deflation problem is to provide mechanical force directly to the outside of the package immediately before the sealing takes place and examples of this are sponge rubber or coiled springs which engage the outside of the package to expel excess air immediately prior to the time the sealing jaws engage and seal the fill opening. This will work with limited success and does not create a problem of contamination of the goods within the package. However, the heat of the sealing jaws and the often irregular surfaces of the goods within the package tend to cause uneven wear of the foam rubber and uneven elongation of the springs. As a result of the uneven wear and deterioration from the close proximity to the heated sealing elements, the long term manufacturing standards may not be maintained at the desired level. Additionally, fragile products such as potato chips are easily crushed by exterior mechanical applications of force. Also, density variations of the product cause changes in the product fill height and these changes can occur within a time span of a few minutes. When using mechanical deflators, correction of these changes requires a shutdown of the machine to modify the deflation force or position.

SUMMARY OF THE INVENTION

This invention has solved the container deflation problem by providing a new deflation method and apparatus which comprises directing a blast of air or other gas to the outside of the flexible plastic sidewalls immediately prior to the time the fill opening of the package is sealed. When the word "air" is used in reference to a blast of air or other gas against the package exterior it will be understood that other gases are equally suitable.

Air is delivered by tubes so located as to direct a blast of air against the outside surface of the package from an orifice formed by the end of each tube or an appropriate nozzle. Each tube is connected to a source of high-pressure air and the orifices are strategically positioned so as to achieve the desired deflation.

A control apparatus is provided in the system to open the feeding chute which delivers a predetermined quantity of goods into the container and a suitable time later a blast of air is directed at the sidewalls of the filled container for a suitable duration, for example one-tenth of a second, and while the blast of air from the orifices is impinging on the outside surface of the package material, the sealing jaws move into sealing engagement to clamp the sidewalls against each other. Immediately upon the engagement of the oppositely directed seal jaws the air supply will cease.

The control apparatus may be adjusted to provide the proper timing and heat to seal the bag at the top and simultaneously, and adjacent thereto, the seal jaws will also form the bottom seal on the next following bag.

A knife or other severing mechanism is provided to sever the closed bag from the bottom of the following bag while the jaws are in contact. After the preset time period for sealing the package the jaws will retract and the process will be repeated.

Objects of the invention not clear from the above will be understood more fully by a review of the drawings and the description of the preferred embodiment which follows.

DESCRIPTION OF THE PREFERRED EMBODIMENT

Figure 1:
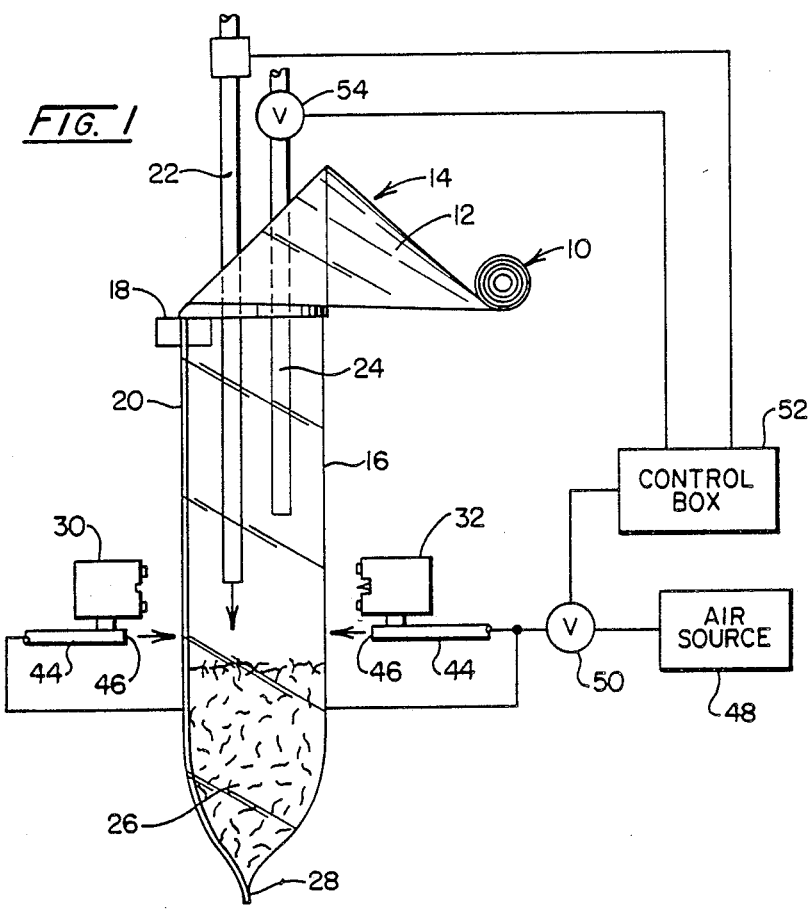
FIG. 1 is a schematic view of apparatus for forming a container, vertically filling the same, and sealing the top of the container with the goods therein.

FIG. 1 shows the general combination of a source 10 of plastic sheet 12 supplied to a forming collar 14 which forms the sheet into an elongated vertical tube 16. At one side of the forming collar 14 is a set of sealing bars 18 to seal the longitudinal edges of the plastic sheet together with a fin or overlap seal 20.

Schematically illustrated is a feeding chute 22 to deliver goods into the hollow tube 16. Normally the feeding chute 22 operates intermittently according to control apparatus 52.

A vacuum tube 24 extends into the hollow tube 16 for withdrawing gas from the interior of the downwardly moving tube 16. The primary function of vacuum tube 24 is to withdraw air from the package after the product or goods 26 have been delivered through the chute 22 and before the top of the package is sealed.

Before product is deposited in the package the bottom or leading edge of the package is sealed to form a bottom seal 28.

Figure 3:
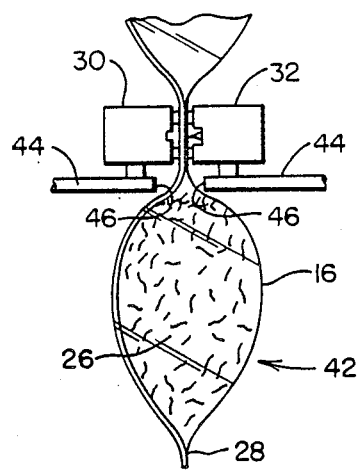
FIG. 3 is a schematic side elevational view of a package according to this invention having been deflated and with the seal jaws, clamped into sealing position and the severing knife about to sever the package from the following package.

Sealing jaws 30 and 32 are located on opposite sides of the tube 16 and are mounted to reciprocate horizontally from an open position as illustrated in FIG. 1 to a closed position as illustrated in FIG. 3. Each sealing jaw includes two sets of heating elements to melt a part of the tube 16 when the sealing elements are in clamped position as illustrated in FIG. 3. Specifically, sealing jaw 30 includes an upper sealing surface 34 separated from a lower sealing surface 36 by a slot 38. The mating sealing surfaces 34 and 36 on sealing jaw 32 are separated by a thin knife blade 40. The term "knife blade" is used in a generic sense in that it may be a sharp linear blade, a roller with a sharp edge which reciprocates across the surfaces, or a hot wire which reciprocates into and out of slot 38. Its purpose is to sever the filled bag 42 from the descending tube.

Attached below each sealing jaw 30, 32 is a duct 44 which ends in an orifice 46. Orifices 46 are substantially coaxially aligned, oppositely directed and located on diagonally opposite sides of the tube 16. Ducts 44 deliver a blast of air at high-pressure against the exterior surface of the tube 16 when the goods 26 have been deposited in the bottom of the package 42 and have settled adequately. The blast from each side should be uniform to get a uniform curvature of the package material above the goods, see FIG. 2. The inward bowing of the sidewalls of the tube under the exterior blast of air tends to push gas out of the tube, the air blast being delivered before the sealing jaws 30, 32 clamp the bag for sealing as illustrated in FIG. 3.

Each air duct 44 is connected to a source of high-pressure air 48 and its discharge and duration of discharge is controlled by a valve 50. While the length of the ducts 44 illustrated in FIG. 2 do not appear to be equal, it is inherent that the most efficient use of the air blast will occur if the magnitude and duration of the air blast through orifices 46 are equal and simultaneous. Therefore, if the valve 50 controls the discharge of air from air source 48 to the ducts 44 by simply opening and closing, it will be required that the length of the duct work between valve 50 and each orifice 46 be the same in each branch of the duct work. Thereby, the blast of air exiting the orifices will be of the same magnitude and the same duration.

A control system may contain many separately operating parts in this system of forming, filling, and sealing packages but for purposes of this invention it is illustrated as a single control box 52. It controls the timing of the dispensing of goods through chute 22, the timing of the opening and closing of the valve 54 for the vacuum tube 24, the timing of the opening and closing of the air valve 50, the reciprocation and sealing the sealing jaws 30, 32, and to activate the severing blade 40 when the jaws are clamped in sealing position as illustrated in FIG. 3.

In an example of a working embodiment packaging egg noodles in one pound units, the packaging material used is a commercially available grade of a laminate about 2 mils in thickness including two layers of polypropylene sandwiching a layer of polyethylene therebetween. The polypropylene is coated such that the appropriate surfaces will melt and bond together when the heated sealing jaws 30, 32 clamp together.

First the sheet 12 is drawn from the roll 10 and formed into a tube 16 by the forming collar 14. As the sheet passes through the collar its side edges are sealed together by sealing bars 18 with a fin or overlap seal 20. After the bottom 28 is sealed, the control box will 52 open the appropriate valve or gate to discharge a predetermined unit of egg noodles through chute 22. Noodles 26 will settle in the bottom of the package 42 below the level of the jaws 30, 32 and the duct work 44. In this embodiment the ducts 44 are copper tubing one-half inch in diameter and the width of the package at the seal is about eight inches. A blast of air of about thirty psi for a duration of about one-tenth of a second begins at a time about one-tenth of a second prior to the time the jaws 30, 32 engage to begin the sealing operation. The air blast is adequate to force most of the gas out of the head space in the package above the goods and below the seal.

The inventors first tried duct work which was one-quarter inch in diameter at substantially higher pressures but it did not work; there was not an adequate volume of air to properly deflect the sidewalls of the container.

Control box 52 opens the valve 50 which discharges air at thirty psi into two equal branches of the duct work.

As soon as the sealing jaws 30, 32 engage, the air blast ceases for at least two reasons. One reason is that it would have absolutely no affect to keep the air blowing because once the opening is sealed no more gas can be forced out of the package. A second reason is that the air blast tends to cool the hot sealing jaws, thereby retarding the speed with which the melting and sealing takes place.

The orifices 46 are set back from the faces of the sealing jaws by about one-half inch to prevent the ducts 44 from abutting and perhaps abrading the packaging material. It is intended that the blast of air will impinge on the sidewalls of the package 42 at a location slightly above the upper level of the goods in the package and in this example the centerline of the orifices 46 is about three-quarters of an inch below the lower sealing surface 36. These parameters yielded a 17% reduction in one pound egg noodle bag volume without modification of the net weight as compared to bag filling apparatus without the air blast feature.

In this particular embodiment the vacuum feature was not employed. In some applications the combination of the air blast and the vacuum may be necessary depending on the particular physical characteristics of the goods 26 and the physical characteristics of the packaging material which may be much stiffer in certain packaging situations.

Figure 5:
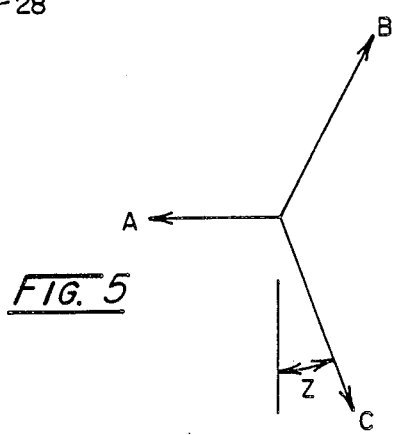
FIG. 5 is a diagram illustrating the approximate vector forces acting on the packaging material when the blast of deflating air is being applied.

FIG. 5 illustrates the approximate vector forces on the surface of the package material wherein:

A—Force on the tube due to air blast
B—Tube support
C—Force due to product weight The vertical component of C must approximate one-half the product weight (W), assuming each side of the tube supports one-half of the weight.

The horizontal components of vector forces B and C will be approximately one-half the vector force A, therefore:

$C \sin(Z) = \frac{1}{2} A$
$C \cos(Z) = \frac{1}{2} W$

Combining the two equations:

$A = W \tan(Z)$

For a given angle Z, the air pressure force required is directly proportional to the weight. Accordingly, the adjustment of the parameters for the pressure of the air blast and to some extent the duration of the air blast will be governed by the weight of the product but it will also be governed by the stiffness of the packaging material and the geometry of the goods being packaged. With the particular apparatus described herein the magnitude and duration of the air blast may be adjusted even while the packaging operation is ongoing to fine tune the deflation of the package.

Figure 2:
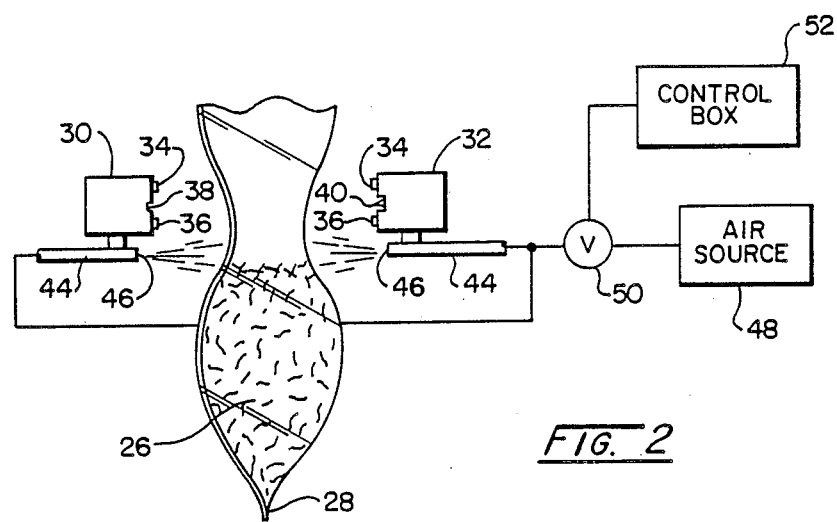
FIG. 2 is a schematic side elevational view of a container accordingly to this invention filled with goods and having a deflation blast of gas directed against the exterior surface of the unsealed package.
Figure 4:
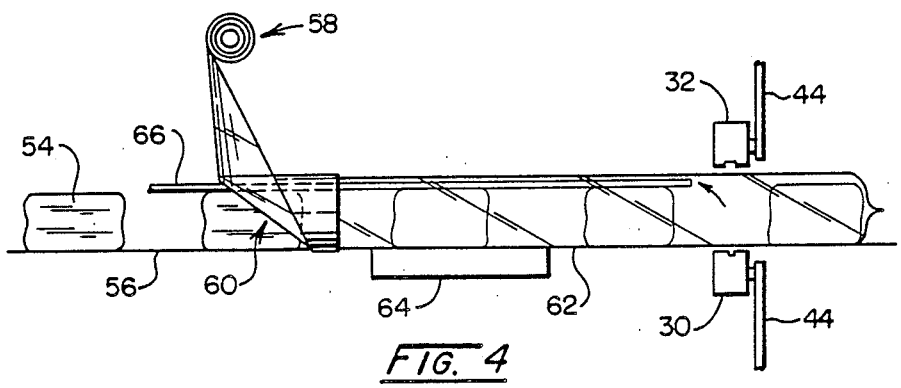
FIG. 4 is an alternative embodiment to the apparatus FIG. 1 where the goods and packaging tube move horizontally rather than vertically.

The embodiment illustrated in FIGS. 1–3 is for vertical feeding of the goods into the package and this is desirable for flowable materials such as potato chips, noodles, peanuts and the like. On the other hand, where the goods are relatively solid material, the packaging may be handled differently as by a horizontal feed of the goods into the formed tube. This is illustrated in FIG. 4 and the horizontal feed may be a one pound block of cheese 54 moving on a conveying mechanism 56.

A roll of sheet plastic material 58 feeds a former 60 which seals the longitudinal edges of the sheet material to form a tube 62 similar to the way the forming collar 14 forms the tube 16 as illustrated in FIGS. 1–3. The longitudinal sealing block 64 is shown in FIG. 4 as located slightly downstream of the former 60 but the apparatus for accomplishing the longitudinal seal is well known in the industry and the particular structure for accomplishing the result is not a part of this invention.

A vacuum tube 66 extends through the former 60 and the tube 62 to perform the same function as the vacuum tube 24 in FIG. 1.

The downstream end of the tube 62 passes between two sealing blocks 30, 32 and duct work 44 which operate in essentially the same fashion as the correspondingly numbered elements illustrated in FIG. 1.

In all examples herein described the vacuum may or may not be used and the air blast feature may or may not be used and in some instances both the air blast and the vacuum will be used. The circumstances of the situation and more particularly the goods will dictate which deflating apparatus is appropriate. In vertical feeding it is more likely that the air blast feature will be the preferable deflating mechanism. Whereas with horizontal feed such as illustrated in FIG. 4 the vacuum deflating mechanism may be more desirable.

Mechanical displacement embodied in the prior art is a fixed object of finite volume outside a package displacing the same volume inside the package by pressing the container wall during each machine cycle. The product inside the package does not always occupy the exact same position or space each time a bag is filled. This results in product crushing or product being pushed into the sealing area causing poor and unsightly seals. This is especially a problem with products of varying density, size and shape. The advantage of the air pressure and vacuum method is that the forces are subtle and can be adjusted to move only the excess material inwardly to displace air from the headspace and not crush or displace product in the process.

Having thus described the invention in its preferred embodiment, modifications will be obvious to those having ordinary skill in the art. For example, the single roll 10 or 58 of packaging material could be a pair of rolls joined at their longitudinal edges to form the tube. It is not intended that the language used to describe the invention nor the drawings illustrating the same be limiting on the invention. Rather it is intended that the invention be limited only by the scope of the appended claims.

We claim:

1. A process for deflating a container, comprising,
   forming a container with a closed bottom, sidewalls and an opening, the sidewalls being of gas impermeable and flexible material,
   supplying the flexible material as a sheet and shaping said sheet into a tube with the longitudinal edges bonded together,
   sealing the leading end of the tube to define said closed bottom of the container,
   placing goods in the container through the opening,
   directing a blast of air against the exterior surface of each sidewall to urge said sidewalls toward each other and thereby drive gas out of the container through said opening, the blasts of air being substantially equal to magnitude and opposite in direction to impinge only on the sidewalls above the level of the goods in the container,
   sealing the opening to prevent the return of the gas to the container, the location of said blasts being below the level of said sealing,
   stopping the blasts of air prior to said sealing of the opening.

2. The process of claim 1 wherein the process is continuous and the sealing of the opening of one container is simultaneous with a sealing to form said closed bottom of the container which is next in the continuum.

3. The process of claim 2 wherein the continuously formed containers are separated, one from the other, by a severing of the tube at a place between the seal at said closed bottom and said opening seal and at about the time the seals are formed.

4. The process of claim 3 wherein the blast of air occurs at about one tenth of a second prior to the time the opening is sealed and for a duration of about one tenth of a second.

5. The process of claim 4 wherein the blast is delivered against the sidewalls about three-quarters of an inch below what will be the seal of the opening.

6. The process of claim 5 wherein a vacuum is drawn inside the package prior to the time the opening is sealed.

7. The process of claim 1 wherein a vacuum is drawn inside the package prior to the time the opening is sealed.

8. The process of claim 1 wherein the blast of air occurs at about one tenth of a second prior to the time the opening is sealed and for a duration of about one tenth of a second.

9. The process of claim 8 wherein the blast is delivered against the sidewalls about three-quarters of an inch below what will be the seal of the opening.

10. The process of claim 1 wherein the blast is delivered against the sidewalls about three-quarters of an inch below what will be the seal of the opening.

11. Apparatus for forming, filling, deflating and sealing a container, said container being formed of a sheet of flexible material having end edges and longitudinal edges, said apparatus comprising, means for forming said sheet into a tube with sidewalls, means for sealing said longitudinal edge together, means for sealing one end edge to itself to form a bottom for the container, another end edge forming an opening into the container, means for placing goods in the container, means for directing at least two blasts of air against the exterior of the sidewalls of said formed container to drive said sidewalls toward each other and thereby drive gas out of the container through said opening, means for sealing the opening to close the deflated container, means for severing the closed container from the tube, said blast directing means being located to direct said blasts against said sidewalls only above the top surface of the goods in the container and below said sealing means, means for controlling the magnitude and duration of said blasts to provide blasts of approximately equal and opposite magnitude and duration, said controlling means including means for stopping said blasts before said sealing takes place.

12. The apparatus of claim 11 wherein the blast is directed against the outside of the container at a location about three-quarters of an inch from the opening.

13. The apparatus of claim 12 including means for starting said blast at about one tenth of a second before the beginning of sealing of said opening and for a period of time of about one tenth of a second.

14. The apparatus of claim 12 wherein the means for sealing the bottom and the means for sealing the opening comprise a pair of sealing jaws mounted to operate as a unit to seal the opening of one container simultaneously with sealing the bottom of the next following container formed from the sheet, the severing means being configured to operate on the tube between the two seals.

15. The apparatus of claim 14 including a pair of ducts connected to a source of high-pressure air; said ducts ending in spaced apart, oppositely directed, substantially co-axial orifices; each orifice being located with its centerline about three quarters of an inch below the means for sealing said opening; said ducts, source of air and orifices comprising the means for directing a blast of air.

16. The apparatus of claim 11 including a pair of ducts connected to a source of high-pressure air; said ducts ending in spaced apart, oppositely directed, substantially co-axial orifices; each orifice being located with its centerline about three quarters of an inch below the means for sealing said opening; said ducts, source of air and orifices comprising the means for directing a blast of air.

17. The apparatus of claim 16 wherein the means for sealing the bottom and the means for sealing the opening comprise a pair of sealing jaws mounted to operate as a unit to seal the opening of one container simultaneously with sealing the bottom of the next following container formed from the sheet, the severing means being configured to operate on the tube between the two seals.

18. The apparatus of claim 11 wherein the means for sealing the bottom and the means for sealing the opening comprise a pair of sealing jaws mounted to operate as a unit to seal the opening of one container simultaneously with sealing the bottom of the next following container formed from the sheet, the severing means being configured to operate on the tube between the two seals.

19. The apparatus of claim 11 including means for starting said blast at about one tenth of a second before the beginning of sealing of said opening and for a period of time of about one tenth of a second.

20. The apparatus of claim 17 wherein the ducts and sealing jaws are mounted to reciprocate together toward and away from said tube, the ducts increasing the force of the air blast against the bag sidewalls as the orifices approach the sidewalls.

* * * * *